United States Patent Office 2,816,873
Patented Dec. 17, 1957

2,816,873

IMPRESSION MATERIALS AND THEIR PRODUCTION

Josef Nogradi, Leverkusen, and Wilhelm Becker, Koln-Stammheim, Germany, assignors to Farbenfabriken Bayer Aktiengesellschaft, Leverkusen, Germany, a corporation of Germany No Drawing. Application April 14, 1954,
Serial No. 423,225

Claims priority, application Germany April 18, 1953

7 Claims. (Cl. 260—17.4)

The present invention relates generally to impression materials and more particularly to impression materials adapted for use in taking dental impressions; furthermore, the invention relates to a process of producing these impression materials.

It is known to produce impression materials, especially for dental purposes from water-soluble alginates and pectinates. These alginates and pectinates are capable of forming elastic, stable gels by cross-linking with most polyvalent metal ions. In this reaction the choice of the metallic salts is of special importance since the amount of cross-linking, and therefore the rigidity or elasticity, of the gel formed is greater or smaller depending upon the nature and quantity of the cation, and also the processing of the impression mixtures requires the beginning of gelation or setting to be delayed for some time after contacting the reactants. Such period of delay can be brought about by the use of sparingly soluble metallic salts; the precipitating cations are thus given up to the alginate solution only slowly, and also the quantity of the cations present is relatively small. The period of delay can be extended or shortened by varying the proportion of alginate and metallic salt or by the use of metallic salts having a different rate of solubility. These restrictive conditions substantially narrow the selection of the salts. Calcium sulphate is most frequently used, and this must be subjected to a certain pretreatment in order to obtain the required sparing solubility.

In accordance with the invention it has been found that metallic salts of the most varied nature which are capable of forming gels with alginates and pectinates can be used in the manufacture of impression materials, without any consideration of their solubility, after covering or coating particles of these soluble salts with film-forming substances which are insoluble in water but soluble in organic solvents. It is a surprising feature of the invention that the metallic salts, coated with water-insoluble film-forming substances which are soluble in organic solvents, release their ions in the presence of water within a period which can be controlled and varied. By appropriately choosing the nature and quantity of the substance used for the preparation of the coatings any desired reaction velocity can be adjusted even in the case of salts having a relatively high rate of solubility in water. The coating on the finely pulverized, gel-forming metallic salts is preferably made in such a manner that the particle size is not increased substantially, since the homogeneity of impression materials is affected by coarser particles. The coating may be prepared according to the invention in the most varied ways. It has proved to be especially advantageous to suspend the metallic salts in the solutions of the film-forming substances and to atomize these suspensions in suitable apparatus so as to evaporate the solvent employed. Only those organic solvents which have no dissolving power for the metallic salt to be suspended are suitable.

The metallic salts used preferably have a solubility greater than about 1–2 grams per liter (at 20° C.). As examples may be mentioned calcium salts which are more soluble than calcium sulphate, for instance salts of organic acids such as calcium lactate or calcium gluconate. Suitable water-insoluble film-forming substances are for instance the chlorinated products of rubber and cyclisation products thereof, and copolymers of vinyl chloride.

It is possible to incorporate in the impression mixtures inert fillers of the most varied nature, for instance diatomaceous earth, precipitated calcium carbonate, alumina, magnesium carbonate, and calcined magnesia. The setting time can be further controlled by means of soluble salts which are capable of forming an insoluble or sparingly soluble salt of the gel-forming cations, for instance sodium carbonate or sodium pyrophosphate.

An advantage of the present invention is that it allows impression mixtures of the most different setting times to be prepared when using a metallic salt of given solubility or a constant ratio of alginate to metallic salt. Due to their higher degree of cross-linking, the impression mixtures obtained according to the invention show a greater elasticity than mixtures prepared from alginates by other processes.

The invention is further illustrated by the following examples, the parts being by weight.

*Example 1*

25 parts of finely pulverized potassium alum dodecahydrate are suspended in 500 parts of a 10% solution of cyclized rubber in methylene chloride. This suspension is atomized in a spray drier. The product thus obtained is used to make the following mixture:

|   | Parts by weight |
|---|---|
| Encapsulated alum | 2.5 |
| Sodium alginate | 5 |
| Precipitated calcium carbonate | 20 |

When stirred with 50 parts of water this pulverulent mixture yields a creamy mass which hardens after 30 minutes.

*Example 2*

50 parts of finely pulverized calcium lactate are suspended in 500 parts of a 10% solution of cyclized rubber in petroleum ether and atomized as described in Example 1.

Impression mixture:

|   | Parts by weight |
|---|---|
| Encapsulated calcium lactate | 3 |
| Sodium alginate | 3 |
| Diatomaceous earth | 15 |
| Potassium carbonate | 0.4 |

When mixed with 45 parts of water the mixture hardens within 5 minutes.

*Example 3*

50 parts of calcium lactate are suspended in 500 parts of a 10% solution of chlorinated rubber in methylene chloride and atomized as described in Example 1. An impression mixture prepared as described in Example 2 hardens within 6 minutes.

*Example 4*

100 parts of finely pulverized calcium lactate are suspended in the solution of 100 parts of cyclized rubber in 1000 parts of methylene chloride and the mixture is atomized as described in Example 1. The product is used to prepare the following mixture:

|   | Parts by weight |
|---|---|
| Encapsulated calcium lactate | 11 |
| Sodium alginate | 9 |
| Heavy spar | 60 |
| Talcum | 20 |

When mixed with 100 parts of a 4% solution of the sodium salt of ethylene amine tetraacetic acid the pulverulent mixture yields a thick creamy mass which hardens to an elastic gel within 10 minutes.

We claim:

1. An impression material adapted for use in taking dental impression consisting essentially of a mixture consisting of (I) a finely divided water soluble salt of a polyvalent metal, said metallic salt being capable of forming gels with alginates, the particles of said metallic salt being coated with an organic film-forming substance being insoluble in water and soluble in organic solvents, and selected from the group consisting of a chlorinated rubber, a cyclized rubber and a vinyl chloride copolymer and (II) a water soluble alginate.

2. An impression material adapted for use in taking dental impression consisting essentially of a mixture consisting of (I) a finely divided calcium salt of an organic acid, the particles of said salt being coated with an organic film-forming substance being insoluble in water and soluble in organic solvents, and selected from the group consisting of a chlorinated rubber, a cyclized rubber and a vinyl chloride copolymer and (II) a water soluble aliginate.

3. An impression material adapted for use in taking dental impression consisting essentially of a mixture consisting of (I) a finely divided calcium lactate, the particles of said lactate being coated with an organic film-forming substance being insoluble in water and soluble in organic solvents, and selected from the group consisting of a chlorinated rubber, a cyclized rubber and a vinyl chloride copolymer and (II) a water soluble alginate.

4. An impression material adapted for use in taking dental impression consisting essentially of a mixing consisting of (I) a calcium gluconate, the particles of said gluconate being coated with an organic film-forming substance being insoluble in water and soluble in organic solvents, and selected from the group consisting of a chlorinated rubber, a cyclized rubber and a vinyl chloride copolymer and (II) a water soluble alginate.

5. An impression material adapted for use in taking dental impression consisting essentially of a mixture of (I) a finely divided water soluble salt of a polyvalent metal, said metallic salt being capable of forming gels with alginates, the particles of said metallic salt being coated with chlorinated rubber, and (II) a water soluble alginate.

6. An impression material adapted for use in taking dental impression consisting essentially of a mixture of (I) a finely divided water soluble salt of a polyvalent metal, said metallic salt being capable of forming gels with alginates, the particles of said metallic salt being coated with cyclized rubber and (II) a water soluble alginate.

7. An impression material adapted for use in taking dental impressions consisting essentially of a mixture of (I) a finely divided water-soluble salt of a polyvalent metal, said metallic salt being capable of forming gels with alginates, the particles of said metallic salt being coated with a vinyl chloride copolymer and (II) a water soluble alginate.

References Cited in the file of this patent

UNITED STATES PATENTS

| | | |
|---|---|---|
| 856,672 | Best et al. | June 11, 1907 |
| 980,936 | Federer | Jan. 10, 1911 |
| 1,286,904 | Atkinson | Dec. 10, 1918 |
| 2,089,552 | Harrison | Aug. 10, 1937 |
| 2,359,512 | Dickson | Oct. 3, 1944 |
| 2,390,137 | Vallandigham | Dec. 4, 1945 |
| 2,431,211 | Vallandigham | Nov. 18, 1947 |
| 2,568,752 | Lochridge | Sept. 5, 1951 |